United States Patent [19]

Szuchy

[11] Patent Number: 4,692,610
[45] Date of Patent: Sep. 8, 1987

[54] FIBER OPTIC AIRCRAFT LOAD RELIEF CONTROL SYSTEM

[75] Inventor: Nicholas C. Szuchy, Babylon, N.Y.

[73] Assignee: Grumman Aerospace Corporation, Bethpage, N.Y.

[21] Appl. No.: 824,124

[22] Filed: Jan. 30, 1986

[51] Int. Cl.[1] .............................................. G01N 3/00
[52] U.S. Cl. ............................... 250/227; 250/231 P; 356/32; 73/800; 73/802
[58] Field of Search .............. 250/227, 231 P; 73/800, 73/802; 356/32, 34

[56] References Cited

U.S. PATENT DOCUMENTS

| | | |
|---|---|---|
| 2,599,578 | 6/1952 | Obert et al. . |
| 3,509,942 | 5/1970 | Lindberg . |
| 3,517,999 | 6/1970 | Weaver . |
| 3,572,618 | 3/1971 | Willett . |
| 3,857,535 | 12/1974 | Osder . |
| 3,910,105 | 10/1975 | Hoffstedt . |
| 4,071,753 | 1/1978 | Fulenwider et al. . |
| 4,123,158 | 10/1978 | Reytblatt . |
| 4,136,929 | 1/1979 | Suzaki . |
| 4,151,747 | 5/1979 | Gottlieb et al. . |
| 4,159,418 | 6/1979 | Marom . |
| 4,162,397 | 7/1979 | Bucaro . |
| 4,163,397 | 8/1979 | Harmer . |
| 4,173,412 | 11/1979 | Ramsay et al. . |
| 4,191,470 | 3/1980 | Butter . |
| 4,203,326 | 5/1980 | Gottlieb et al. . |
| 4,238,856 | 12/1980 | Bucaro et al. . |
| 4,295,738 | 10/1981 | Meltz et al. . |
| 4,302,745 | 11/1981 | Johnston et al. . |
| 4,317,614 | 3/1982 | Palmer . |
| 4,342,907 | 8/1982 | Macedo et al. ........................ 356/32 |
| 4,405,231 | 9/1983 | Shemyakin et al. . |
| 4,420,251 | 12/1983 | James et al. . |
| 4,421,979 | 12/1983 | Asawa et al. . |
| 4,422,180 | 12/1983 | Wendt . |
| 4,442,350 | 4/1984 | Rashleigh . |
| 4,459,477 | 7/1984 | Asawa et al. . |
| 4,463,254 | 7/1984 | Asawa et al. . |
| 4,473,270 | 9/1984 | Shaw . |
| 4,475,812 | 10/1984 | Buczek et al. . |
| 4,477,725 | 10/1984 | Asawa et al. . |
| 4,479,701 | 10/1984 | Newton et al. . |
| 4,525,626 | 6/1985 | Kush et al. ........................... 250/227 |
| 4,560,016 | 12/1985 | Ibanez et al. ........................ 250/227 |
| 4,581,527 | 4/1986 | Crane et al. ......................... 250/227 |
| 4,603,252 | 7/1986 | Malek et al. ........................ 250/227 |

FOREIGN PATENT DOCUMENTS

| | | |
|---|---|---|
| P 2345309 | 4/1975 | Fed. Rep. of Germany . |
| 0219503 | 11/1985 | Japan .................................... 73/800 |
| 815488 | 3/1981 | U.S.S.R. . |
| 896396 | 1/1982 | U.S.S.R. . |

OTHER PUBLICATIONS

Interavia 4/1983, pp. 317–319, Technical Note on Distributed Fiber-Optic Sensors.
S. A. Kingsley of Batelle, Columbus Laboratories, Columbus, Ohio 43201, September 7, 1983.

Primary Examiner—Edward P. Westin
Assistant Examiner—Charles Wieland
Attorney, Agent, or Firm—Stetina and Brunda

[57] ABSTRACT

A fiber optic load measuring system is disclosed comprising an optical pulse generator, an optical bus, a plurality of optical pulse routing switches, a plurality of optical attenuators disposed along the surface where the load is to be measured, a plurality of optical pulse routing switches, and a signal processor. The optical attenuators are each connected to a dedicated optical pulse routing switch and are adapted to vary the attenuation of the optical pulse in response to the applied load. The optical pulse routing switches are adapted to selectively direct the optical pulses to individual optical attenuators, such that each of the optical attenuators is separately and sequentially pulsed.

14 Claims, 7 Drawing Figures

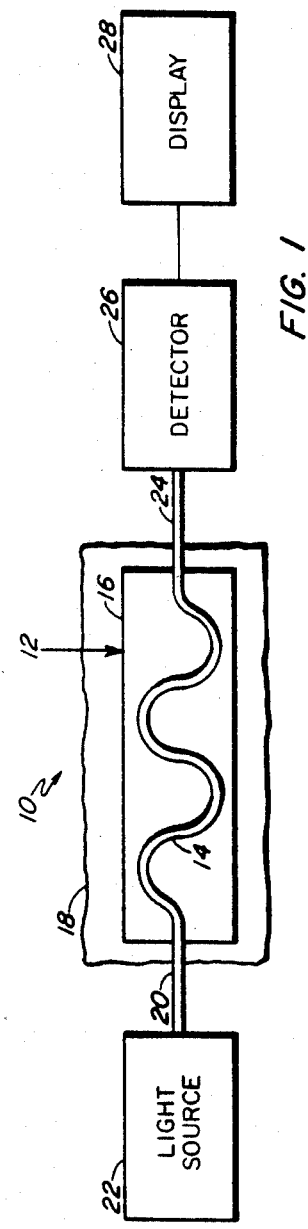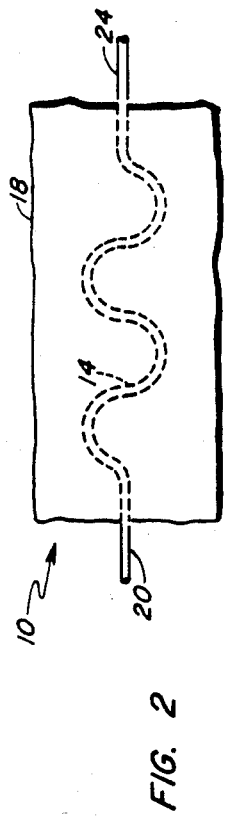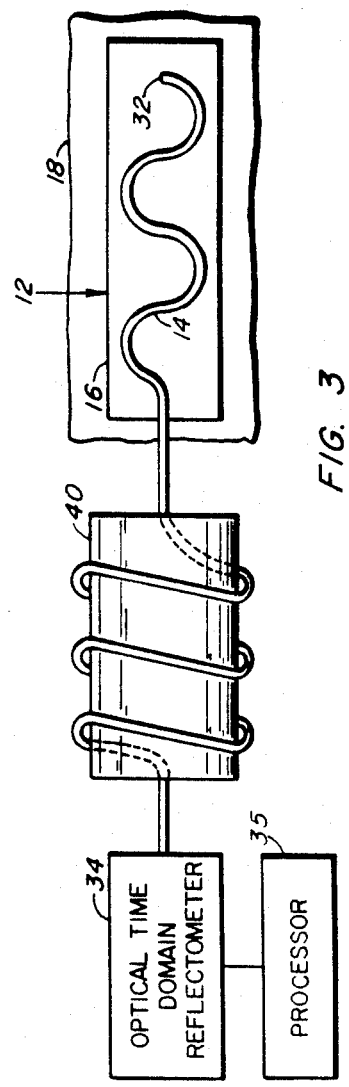

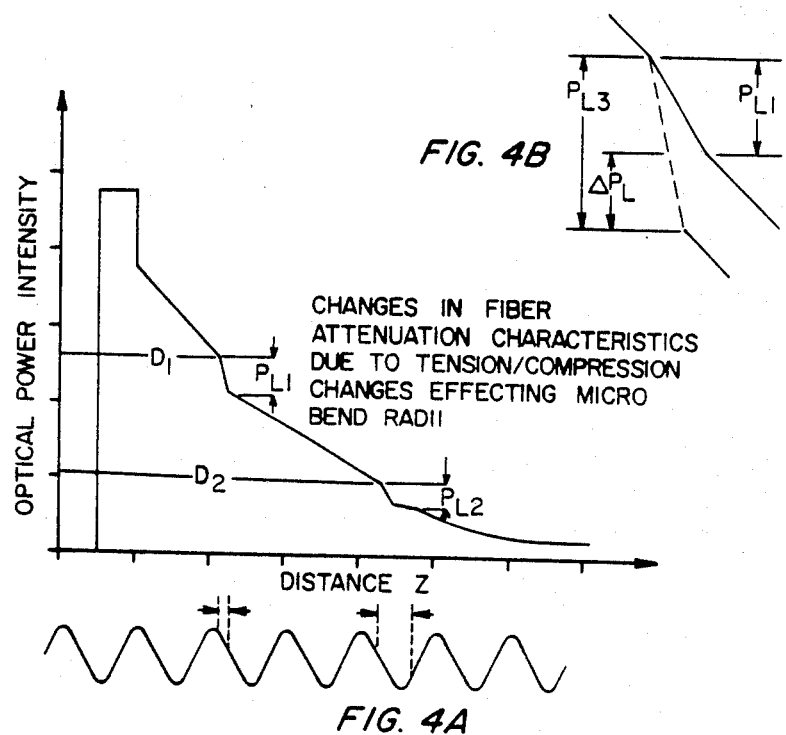
FIG. 4A
FIG. 4B
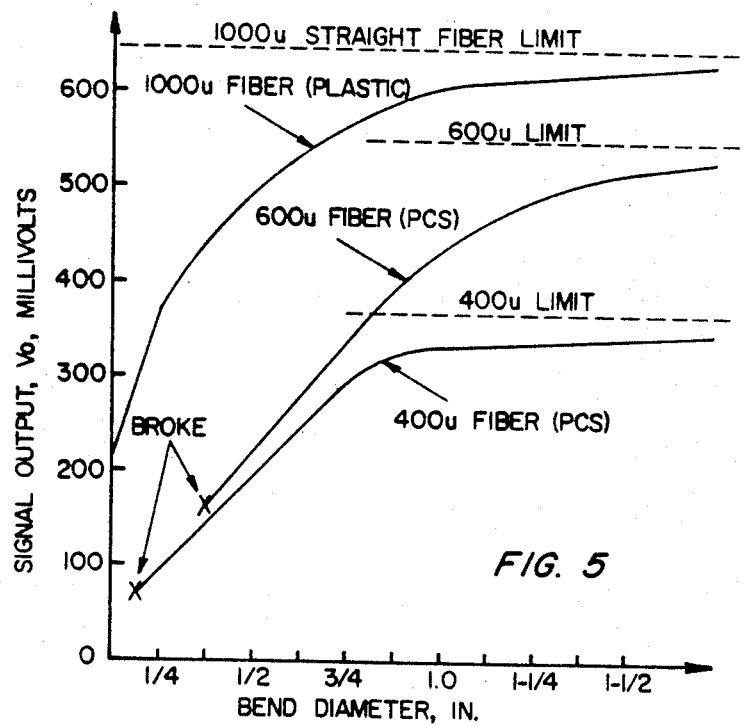
FIG. 5

FIBER OPTIC AIRCRAFT LOAD RELIEF CONTROL SYSTEM

BACKGROUND OF THE INVENTION

This invention relates to an apparatus and method for measuring strain on a structural surface. More particularly, the invention relates to a fiber optic sensing system attachable to a surface where strain is to be measured and adapted to attenuate the light signal transmitted through a curved portion of fiber optic material in relation to deformation of a curved portion in response to strain applied to the surface.

Optical fibers in general are known in the art, and typically comprise a transparent core of a suitable glass or plastic material which is carried within a relatively thin cylindrical cladding having an index of refraction less than the refractive index of the core. When a light signal such as a collimated beam generated by a laser is focused upon one end of the fiber, the fiber core functions as a waveguide to transmit or propagate the light signal through the core with relatively small internal intensity losses or transmission of the signal to the cladding.

A fiber optic transducer for measuring strain or pressure has an advantage over a mechanical or electrical transducer in that it is not disturbed by electromagnetic interference at other than optical frequencies. This is particularly desirable for making measurements in electromagnetically noisy environments such as various points inside a jet engine, in electrical transmission and distribution equipment, or other environments where strong electric and/or magnetic fields may be present. Fiber optic sensors may also be advantageously formed as an integral portion of fiberglass composite structures and used to measure the structural integrity or loads applied thereto. Such fiber optic detectors are economical and durable, and introduce a minimum of additional weight to the structure.

Optical fibers of the type utilized in the present invention are characterized in that straight portions or portions having gradual bends in the fiber have little or no effect upon transmission of the light signal, thereby permitting low loss transmission through the fiber for emission at the opposite end of the fiber regardless of the number of gradual bends and turns. Practical applications of such light conductive fibers have included, for example, devices to illuminate or to permit viewing of inaccessible areas, such as areas inside the human body, or as a telecommunications link wherein the light signal is modulated to represent information that can be detected and demodulated at the opposite end of the fiber.

It has been recognized, however, that relatively sharp bends in such optical fibers can have a significant effect upon the transmissivity of the fiber core. More specifically, the presence of a sharp bend having a bend diameter on the order of a few millimeters, commonly referred to as a microbend, results in substantial attenuation of the propagated light signal. That attenuation results from scattering of a portion of the signal from the fiber core to the cladding. Most of the scattered light portion is ultimately lost to the surrounding environment. The microbending consequently causes a detectable attenuation of a light signal passing through the fiber, wherein the degree of attenuation is indicative of the curvature of the fiber.

Contemporary optical strain measurement systems include one or more optical fibers fixed to the surface where strain is to be measured. The output of such systems is typically analyzed to detect an applied load by monitoring phase velocity, crosstalk, light intensity, or interference between adjacent fibers. Such systems do not include an optical transducer, as disclosed below, designed to interact with an applied optical signal such that the attenuation of the optical interrogating signal is made to be a linear function of the applied load. Additionally, none of those systems include a load measurement system wherein the applied load may be measured by linear scaling of irregularities in an optical signal received from a fiber optic sensor. Consequently, such contemporary optical systems typically require complex processing to resolve the applied strain and may be unsuitable for application wherein the interrogating signal is modulated.

Moreover, contemporary optical measurement systems are not believed to disclose or suggest a load measurement system wherein a predetermined number of interrogating pulses of substantially identical form are progressively directed to each of a plurality of optical transducers disposed in parallal along a common optical bus.

SUMMARY OF THE INVENTION

A fiber optic load measuring system is disclosed comprising an optical pulse generator, an optical bus, a plurality of optical pulse routing switches, a plurality of optical attenuators disposed along the surface where the load is to be measured, a plurality of optical pulse routing switches, and a signal processor. The optical attenuators are each connected to a dedicated optical pulse routing switch and are adapted to vary the attenuation of the optical pulse in response to the applied load. The optical pulse routing switches are adapted to selectively direct the optical pulses to individual optical attenuators, such that each of the optical attenuators is separately and sequentially pulsed.

BRIEF DESCRIPTION OF THE DRAWINGS

FIG. 1 is a schematic representation of a fiber optic strain measurement system formed in accordance with the present invention;

FIG. 2 illustrates an alternate embodiment of the invention shown at FIG. 1 wherein the optical fiber is formed integral with the surface where strain is to be measured;

FIG. 3 illustrates another embodiment of the invention wherein the applied load is measured by monitoring the intensity of backscattered light;

FIGS. 4A and 4B are a representation of the attenuation characteristics of the backscatter signal generated during operation of the embodiment illustrated at FIG. 3;

FIG. 5 is a graph illustrating the linear attenuation region in which the fiber optic material is biased.

DETAILED DESCRIPTION OF THE PRESENTLY PREFERRED EMBODIMENT

Figure 6:
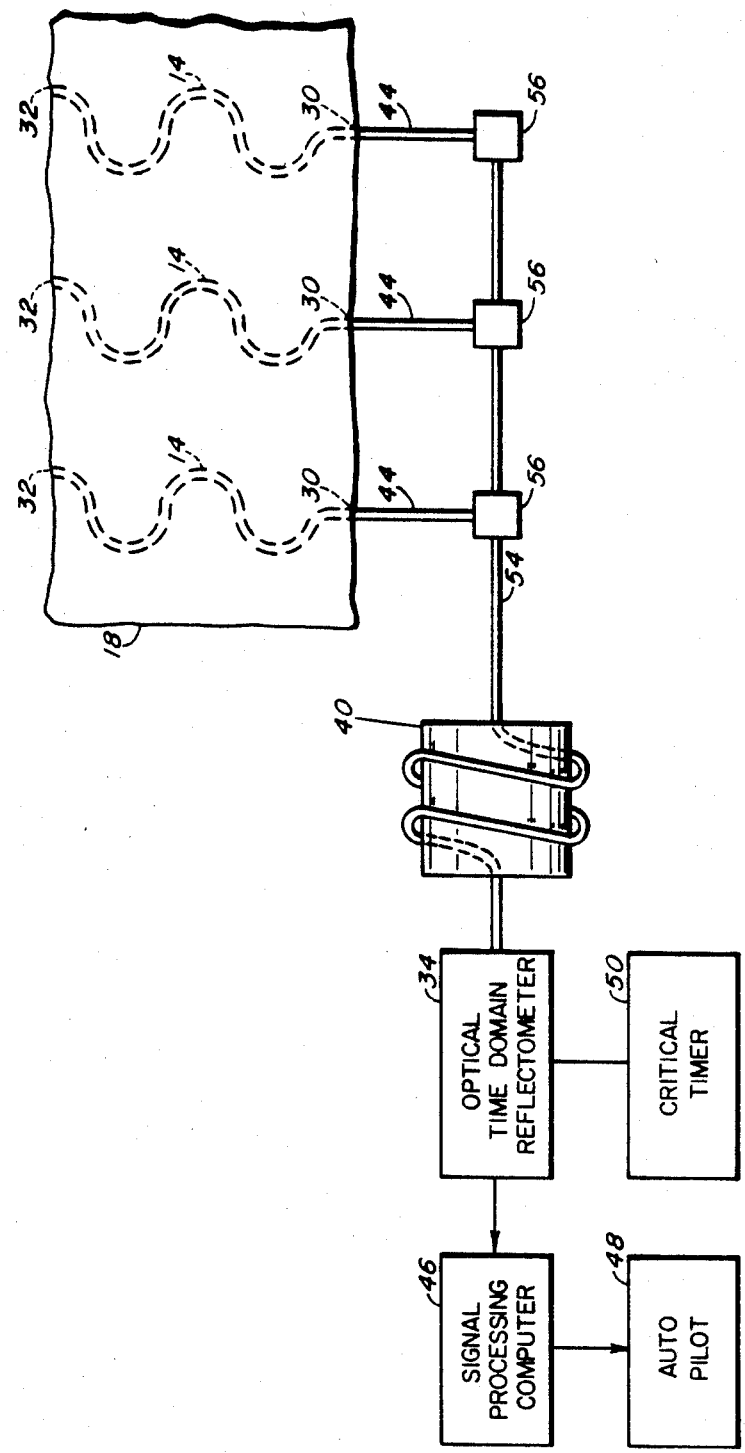
FIG. 6 illustrates a network of strain sensors formed in accordance with the present invention.

An optical fiber system 10 is illustrated generally in FIGS. 1 and 2 and is adapted for use in detecting and quantifying forces acting along a length of surface 18. The system illustrated is useful in monitoring forces such as structural stress acting upon the surface of structures such as bridges, aircraft, submersible vehicles, as well as various types of pressure sensitive vessels useful in manufacturing.

FIG. 1 illustrates an arrangement for monitoring an applied load. The arrangement includes an optical fiber sensor 12, a light source 22, and a light receiver or photodetector 26. Sensor 12 includes a curved optical fiber 14, also referred to as an optical attenuator, mounted upon a substrate 16, which in turn is secured to the surface 18. In this embodiment, the optical fiber carries light from a first predetermined point along its length towards a second spaced apart predetermined point. The optical fiber includes at least one flexible curved section located between those points and is constructed such that the amount of light passing through the fiber from the first point to the second point, through the flexible curved section, varies with changes in the radius of curvature of the curved section, at least within a limited range of curvature.

The optical fiber 14 is preferably shaped to include a plurality of curved portions collectively forming a serpentine pattern. The curved or microbend regions of the fiber normally cause a steady state ejection of light from the core of the fiber into the cladding. As will be understood by those skilled in the art, rays propagating in the straight section of the fiber at an angle less than a critical angle may have their angle of incidence on the core cladding interface increased by the bends, and thus be partially transmitted into the cladding. Surface motion due to tension or compression is communicated to the curved fiber and will introduce minute additional bends or straightening of the fiber, causing a modulation in the light transmitted through the fiber core beyond the normal attenuation of the light signal.

In conventional application for optical fiber cables, i.e., transmitting information between two points, the usual requirement is to minimize light losses through the fiber. Many commercially available fibers are currently fabricated in a manner so as to reduce such attenuation losses, attributable to factors such as the mode stripping affect resulting from ray impingement angle changes upon the core to cladding interface as the sensing fiber is bent, i.e., the Snell angle changes. Various fiber characteristics such as fiber diameter, fiber construction (e.g., glass or plastic fibers), numerical apperture and degree of bend will affect the attenuation characteristics of the fiber 14. However, for fiber optic sensor applications of the present invention, unique properties may be enhanced that could be considered detrimental for information transmittal; such as enhancing the microbend affect and increasing fiber flexibility.

As stated previously, there is a varying amount of light loss resulting from the bend in an optical fiber, such that this bending loss can be used advantageously to monitor load, and can be extremely sensitive to small changes in certain relevant parameters. Any fiber of the described type can be made to cease transmitting entirely by bending it sharply enough. How small the bend radius must be in order for the loss $\alpha$ to be appreciable will depend upon the light wavelength and fiber parameters according to the following relation:

$$\alpha = 2 \frac{\beta^2 - n^2k^2}{n_ck} \exp\left[\frac{-2}{3} n_ckR \left[\frac{\beta^2 - n^2k^2}{} - \frac{2a}{R}\right]^{3/2}\right]$$

$n_c$ = core index n = cladding index
a = core radius
k = $2\pi/\lambda$
$\beta$ = mode propagation constant
R = bending radius
$\lambda$ = light wavelength From this relation, it can be seen that the change in bend loss can be used to measure environmental changes, if either the core or cladding indices, or bending radius, change with the applied load. However, this expression gives the loss only for the one mode whose propagation constant is $\beta$, so that for a multimode fiber the loss of each mode is separately calculated, and summed to give the total loss. In general, only the modes very near cutoff will have an appreciable loss, so the best load sensitivity will be attained in a single mode fiber monitor.

FIG. 5 illustrates the attenuation characteristics of several different fibers. FIG. 5 illustrates the transmission characteristics of a 400 micron (0.0016 inches) plastic clad silica (PCS) fiber; a 600 micron (0.0124 inches) PCS fiber; and a 1000 micron (0.04 inches) plastic fiber. As demonstrated at FIG. 5, each of the fibers tends to reach a saturation point with respect to the signal output. Additionally, the signal output from each fiber generally decreases as the bend diameter decreases and may ultimately result in breaking the fiber, as illustrated with respect to the 600 micron and 400 micron fibers.

In between the fiber saturation limit and the smallest bend diameter that the respective fiber can accommodate exists a generally linear region wherein changes in bend diameter, responsive to the applied load, are generally linearly related to the signal output for a constant input light signal. For example, the 400 micron fiber exhibits generally linear response characteristics when the fiber bend diameter varies between one quarter inch ($\frac{1}{4}''$) and three quarter inches ($\frac{3}{4}''$). The 600 micron fiber exhibits generally linear response characteristics between three eights inches ($\frac{3}{8}''$) and one inch (1''). The 1,000 micron fiber exhibits substantially linear response characteristics when the bend diameter varies between approximately three eighths inches ($\frac{3}{8}''$) and seven eighths inches ($\frac{7}{8}''$).

Static losses through the serpentine shaped fiber may be disregarded in some applications, e.g., where light source 22 emits a constant light signal, such that the detector 26 and display 28 respond only to the variations in intensity of the signal resulting from a variation in the bend diameter due to the application of load on the surface 18. By forming the optical fiber 14 to have bend diameters corresponding to the linear portion of the characteristic response curve for that particular fiber, i.e., biasing the fiber at or near the center of the linear operating region, the detected attenuation of the received signal can be readily converted to a value representative of the deformation of the fiber 14 responsive to the load or strain applied to surface 18. For example, where the 400 micron fiber is provided with a bend radius of approximately one half inch ($\frac{1}{2}''$), it will demonstrate linear response characteristics where the stress induced bend of the fiber causes the bend radius to vary between one quarter inches ($\frac{1}{4}''$) and three quarter inches ($\frac{3}{4}''$). Accordingly, the precise shape of the fiber 14 is chosen such that, for a particular size and composition of the fiber utilized, the fiber is essentially biased into a linear region of conductivity wherein the physical displacement of the fiber 14 due to the application of strain upon surface 18 is linearly translated to attenuation of the light signal received at receiver 26. It is to be understood that selection of materials, the size of the optical fiber, and other factors that affect the existence and parameters of the linear region of attenuation may be varied in order to utilize the invention in a specific environment, or for different applications.

Moreover, it is also understood that the relation between the applied load and the deformation of the curved fiber portions may vary with the composition of the structure supporting the fiber 14, as well as other environmental conditions. In the simplest case, the relationship between applied load and the fiber deformation is a linear function. Unless otherwise specified, such a linear relationship will be assumed in the discussion below.

As previously mentioned in connection with FIG. 1, optical sensor 12 comprises a substantially serpentine shaped optical fiber 14 mounted on a substrate 16. The substrate 16 may be formed of any of a variety of materials such as glass, various types of plastics or plastic clad silica. The substrate 16 is fixed to the surface 18 such as by gluing or taping, such that variations in the contour of surface 18 in response to applied load are communicated to the optical fiber 14 to thereby vary the shape of optical fiber 14.

Light source 22 may be a coherent or noncoherent light source, and may operate in either the visible or infrared portions of the electromagnetic spectrum. The light source 22 is coupled in the first end, or input 20 of optical fiber 14, and may be located at any desired distance from fiber 14. Similarly, the second end, or output 24 of optical fiber 14 is connected to a detector, i.e., photodetector 26, that also may be disposed at any desired distance from sensor 12. The output of the photodetector is typically amplified by an amplifier (not shown) and passed to an output terminal, to which any suitable piece of equipment may be connected to utilize the information emplaced on the optical signal by the transducer. A power supply (not shown) supplies electrical power to the light source, the photodetector and the amplifier, and may be portable.

The light source 22 may be constructed in any convenient form; however, two forms are presently preferred. Firstly, a constant intensity output may be supplied from the light source. Secondly, the light source may supply a train of constant amplitude pulses at a sufficiently high repetition rate. In the latter case, amplitude modulation of the pulse train produces pulse amplitude modulation that may be suitable for use directly by some audio systems. The presently preferred device for performing this light modulating function is a light emitting diode. Such components are readily available, consume a minimum of power, may be easily adapted for use in optical fiber systems, and may be operated continuously or may be pulsed.

Photodetector 26 is preferably constructed to detect variations in the intensity of the light signal transmitted through fiber 14 and generate a responsive electrical signal that is communicated to a display device 28, which may be an oscilloscope, a meter, a printer, or other similar device. Photodetector 26 may be implemented as a photodiode which for economic reasons is preferably of the non-avalanche type. A typical photodiode which is suitable for use in this application is model SGD-040A silicon photodiode produced by EG&G, Inc., Bedford, Mass. The photodiode converts the incident optical power into an electrical signal containing the information derived from the optical signal which may then be amplified by the detector amplifier (not shown). The detector amplifier provides sufficient gain so that its output may be utilized in whatever succeeding apparatus is connected to the output terminal.

Referring to FIG. 2, the construction indicated therein is generally identical to that illustrated at FIG. 1, with the exception that the optical fiber 14 is shown embedded into the surface where the load is to be measured, rather than attached to the surface by means of a supporting strip 12. Though it is envisioned that the construction illustrated at FIG. 2 may be used in conjunction with various types of surfaces, that construction is believed to be particularly useful where the surface 18 is formed of a composite material such that the fiber 14 may form an integral, load bearing portion of the surface.

FIG. 3 illustrates another embodiment of the present invention for measuring the load applied to a surface. That embodiment includes an optical time delay reflectometer (OTDR) 34 operative to generate and direct light signals to the curved optical fiber 14 and to receive light signals reflected from fiber 14 via optical signal delay element 40. The embodiment illustrated at FIG. 3 also includes a signal processor 35 adapted to receive information from OTDR 34, and to detect and measure variations in the reflected optical signal attributed to or applied to the material under study. Signal processor 35 is operative to translate the detected variations to compute the applied load.

OTDR 34 includes a light source for generating a light signal, e.g. a pulsed light signal through the fiber 14, and a photodetector for detecting the intensity of backscattered light reflected back through the fiber 14 as a function of time. OTDR 34, in cooperation with processor 35, thus provides an indication of backscattered light intensity for each point along the length of the fiber, thereby enabling measurement of the load applied at various points along the surface corresponding to locations along the length of fiber 14.

The unloaded attenuation in backscattered light intensity at each microbend is sensed by the OTDR 34, in cooperation with processor 35, indicate the location and magnitude of the attenuation, thereby identifying the location and magnitude of the force acting upon the structure. Optical power intensity attenuation $P_{L1}$ and $P_{L2}$, illustrated in FIG. 4A at distances "$D_1$", and "$D_2$", along the length of the fiber 14, correspond to the magnitude of the static attenuation attributable to the microbends under no load conditions, i.e., the normalized load. Optical power intensity attenuation $P_{L3}$, shown at FIG. 4B represents the power loss attributable to the same microbend as represented by $P_{L1}$, with a load applied. The difference in power loss between $P_{L1}$ and $P_{L3}$ is identified as $\Delta P$, the dynamic power loss. In accordance with the present invention $\Delta P$ corresponds linearly with deformation of the curved fiber attributable to the load, and consequently corresponds to the magnitude of the load applied. The output of the photodetector can be scaled to provide a direct reading of the strain magnitude.

In view of the attenuation characteristics depicted at FIGS. 4A and 4B, the invention operates as follows. Having bent and disposed the optical attenuator as earlier described so as to linearly attenuate any signals sent along said optical attenuator, a light signal, also referred to as an interrogating signal is communicated to the optical fiber portion 14. A return signal is reflected and attenuated to a degree linearly related to the microbend radii. The signal is processed by a processor by linearly translating the deviations in the return signal intensity to determine the unloaded characteristics as well as to measure the load applied to the material being studied. Thus, for example, if a deviation such as $P_{L3}$ in FIG. 4B is greater or less than the magnitude of the deviation of $P_{L1}$, the difference in deviation may be linearly translated to derive the deformation of fiber 14, and ultimately to the applied load, in accordance with scaling factors corresponding to the particular construction and environment of use. By sending a series of interrogating pulses and subsequent processing of the data received, the present invention permits monitoring of the changes occurring at the fiber 14 over a period of time by comparing or linearly scaling the deviations to provide a comprehensive analysis of the load applied to the material being tested overtime. Furthermore, if a plurality of fibers 14 are used, and the results correlated, a comprehensive picture of the entire surface may be perceived. It is anticipated that the results of such an analysis may in turn be used to regulate control functions that affect the applied load. Thus, for example, information relating to the applied load along an aircraft surface may be communicated to an aircraft controller, such as Auto Pilot 48 shows at FIG. 6, to permit automatic adjustment of the aircraft control surfaces in response to the load. One exemplary system for regulating aircraft control surfaces in response to a sensed load is disclosed in U.S. Pat. No. 4,422,180 for Control Signal Transmitter Apparatus Particularly for Aircraft. It is to be understood, however, that various control systems may be utilized in conjunction with the present invention other than the system disclosed in the cited reference. Moreover, it is also to be understood that the present invention may be used in conjunction with various manufacturing processes wherein the process may be regulated in response to sensed pressure conditions.

FIG. 6 illustrates a sensor network comprising a plurality of interconnected optical fibers 14, as illustrated at FIGS. 1 and 2. In the network illustrated at FIG. 6, each fiber 14 is preferably disposed adjacent a discreet portion of the surface where strain is to be measured. Separate circuits may be formed to interconnect additional strain sensors elsewhere on the same surface, or on a different surface. The various circuits may be interconnected to a multiplexed light source, or reflectometer, in order to isolate the fiber 14 responsible for a variation in conductivity in any circuit.

The arrangement depicted in FIG. 6 includes a plurality of the above-described sensors arranged in a network. The fiber optical system of FIG. 6 invention comprises an OTDR 34; critical timer 50; signal processor 46; autopilot 48; optical delay element 40; an optical bus 54; a plurality of optical pulse routing switches 56; and a plurality of optical fibers 14. The basic principles of the presently described network system are analogous to those earlier described, that is, a pulse or signal is generated by a light source and directed toward the optical sensor for attenuation and subsequent analysis by OTDR 36 and processor 46 in conjunction with critical timer 50. However, additional elements are included to deal with the new problems which arise with the integration of signals from a plurality of sensors.

More specifically, a signal generated by an optical pulse generator is initially passed along a connecting bus to the individual sensor system to be tested. In accordance with the present invention, the optical pulses may be distributed such that each succeeding pulse is directed to a different one of the fibers 14 until each fiber has been pulsed. The sequence may then be repeated. Moreover, each pulse preferably passes through only one of the optical fibers 14, thereby eliminating interference from pulses passing through other fibers. That selective diversion of pulses from optical bus 54 may be accomplished in several different ways.

By encoding or addressing the signal or optical pulse as it leaves OTDR 34, the signal may be made specific for an individual sensor system. Upon encountering the pulse routing switch for an individual fiber 14, the pulse routing switch may recognize the encoded signal and selectively route the optical signal onto the sensor circuit with which it is associated, for interaction with the optical sensor it contains. By this means each individual fiber 14 can be separately addressed and normalized.

In the alternative, uniform pulses may be sent to the optical bus 54. In this embodiment the optical pulses are not encoded and selective routing is effected by the action of switches 56, which, for example, will divert only the first pulse received at the switch, until each of the switches have progressively been activated.

Upon return of each reflected signal the load magnitude and locational information may be determined to normalize each load analysis and compute the load applied to each fiber 14 as previously described. The return signals can also be compared with each other to determine the stresses or loads, or rates thereof, across the material to be examined.

By putting additional multisensor circuits in parallel with the first circuit and electronically multiplexing the sensed signals, it is possible to further extend the invitation to easily measure complex strain fields of interest.

As described above, the foregoing description represents only the presently preferred embodiment of the invention. Various modifications and additions may be made to the invention without departing from the spirit or scope of the invention, which is intended to be limited only by the scope of the appended claims.

What is claimed is:

1. A fiber optic load measuring system comprising:
   (a) an optical pulse generator;
   (b) an optical bus connected to said optical pulse generator;
   (c) a plurality of optical pulse routing switches serially disposed along the length of said optical bus;
   (d) a plurality of optical attenuators, each of said optical attenuators being disposed along a dedicated surface where an applield load is to be measured, each of said optical attenuators further being connected to a dedicated optical pulse routing switch and being operative to vary the attenuation of the optical pulse in response to the applied load as said optical pulse is reflected by said optical attenuators;
   (e) said optical pulse routing switches being operative to selectively direct said optical pulses to individual optical attenuators such that each of said optical attenuators is separately pulsed;
   (f) an optical pulse receiver connected to said optical bus and operative to receive optical pulses reflected from said optical attenuators; and
   (g) a signal processor connected to said optical receiver and operative to process the signal received by said optical pulse receiver to determine the load along each of said surfaces.

2. The system as recited in claim 1 further including an optical pulse delay element, said delay element being disposed so as to interface said optical pulse generator and said optical pulse receiver with said optical bus, said optical pulse delay element being operative to delay optical pulses communicated between said optical bus and said optical pulse generator, and between said optical bus and said pulse receiver.

3. The system as recited in claim 1 wherein said optical pulse generator and said optical pulse receiver comprise a reflectometer.

4. The system as recited in claim 1 wherein said optical attenuators are operative to vary the intensity of the optical pulse reflected thereby in accordance with the load applied along the surface where the optical attenuator is disposed.

5. The system as recited in claim 4 wherein said optical attenuators are operative to linearly vary the optical pulse reflected thereby in response to instantaneous variations in the applied load.

6. The system as recited in claim 1 wherein said optical attenuators comprise serpentined optical fibers.

7. The system as recited in claim 1 wherein said pulse delay element comprises a spool having a predetermined length of optical fiber.

8. The system as recited in claim 1 wherein said optical attenuators each comprise a length of fiber optic material having at least one curved portion, said curved portion being deformable in response to an applied load, said curved portion being dimensioned such that light optical pulses passing therethrough are attenuated in linear relation to the instantaneous deformation of said curved portions in response to the applied load.

9. The system as recited in claim 8 wherein said curved portions have a bend radius dimensioned so as to attenuate optical pulses passing therethrough in linear relation to the deformation of said curved portion in response to the applied load.

10. The system as recited in claim 8 wherein said curved portion is dimensioned to provide static attenuation of the light passing therethrough, said curved portion also being dimensioned to provide variable dynamic attenuation of optical pulses passing therethrough, said dynamic attenuation being linearly related to the instantaneous deformation of said curved portion in response to the applied load.

11. A method of measuring the load applied to a surface comprising communicating a plurality of optical pulses to an optical bus; disposing a plurality of optical pulse routing switches along the length of said optical bus; disposing a plurality of optical attenuators along a surface where a load is to be measured, each of said optical attenuators being disposed along a dedicated surface portion and connected to a dedicated optical pulse routing switch; selectively directing said optical pulses to individual optical attenuators such that each of said optical atttenuators is separately pulsed; receiving optical pulses reflected from said optical attenuators; and processing said received optical pulses to determine the load along each of said surface portions.

12. The method as recited in claim 11 wherein said step of disposing a plurality of optical attenuators comprises the step of bending a length of fiber optic material so as to form an optical attenuator, the degree of bending being selected such that the optical conductivity of the fiber optic material will vary in linear relation to the instantaneous load applied to the fiber optic material.

13. The method as recited in claim 11 wherein said step of disposing a plurality of optical attenuators includes the step of bending a length of fiber optic material so as to form an optical attenuator, the degree of bending being selected such that the bent fiber optic material provides static attenuation of optical pulses passing therethrough, the bent portion further providing variable dynamic attenuation of light passing therethrough, said dynamic attenuation being linearly related to the instantaneous deformation of said bent portion in response to the applied load.

14. The method as recited in claim 11 wherein said step of selectively routing optical pulses comprises the step of generating a plurality of substantially identical optical pulses; communicating said substantially identical pulses to said optical bus; and sequentially directing one of said optical pulses to each of said optical attenuators in a sequence determined by the location of said dedicated optical pulse routing switches.

* * * * *